Oct. 6, 1970

J. S. CARUSO 3,531,931

AIR POLLUTION CONTROL DEVICE

Filed Feb. 2, 1968

INVENTOR.
JOHN S. CARUSO
BY
*Bertram Frank*
ATTORNEY

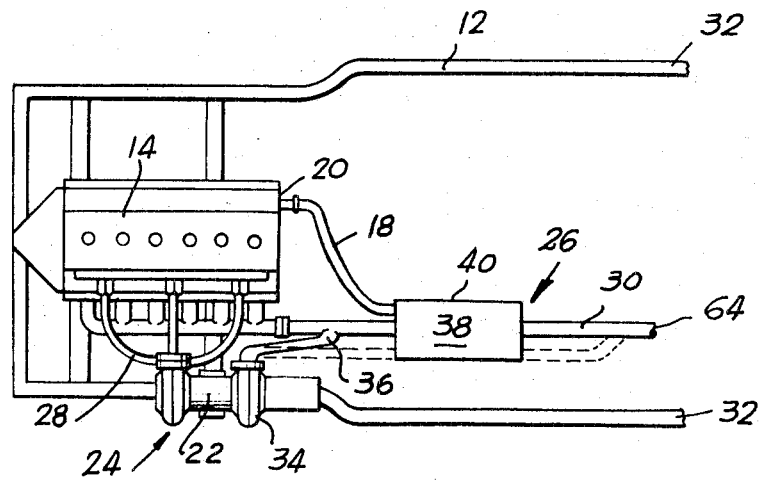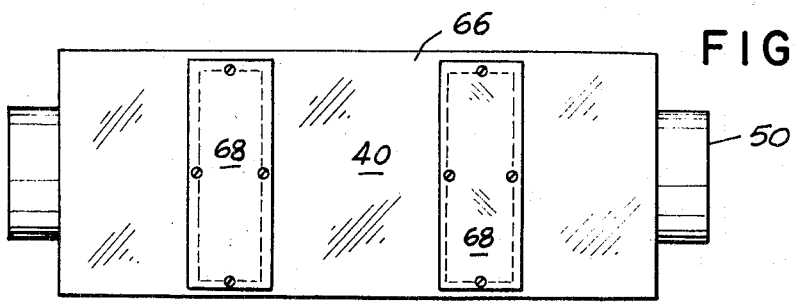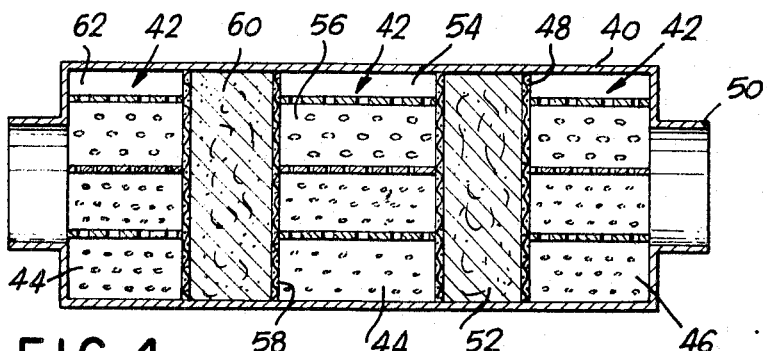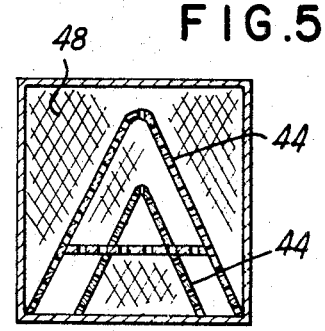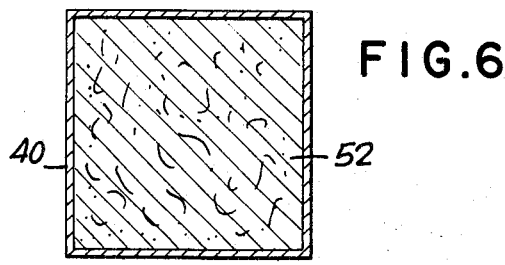

United States Patent Office 3,531,931
Patented Oct. 6, 1970

3,531,931
AIR POLLUTION CONTROL DEVICE
John S. Caruso, 3510 35th St.,
Astoria, N.Y. 11106
Filed Feb. 2, 1968, Ser. No. 707,007
Int. Cl. F02n 3/10
U.S. Cl. 60—30     5 Claims

ABSTRACT OF THE DISCLOSURE

An exhaust treatment system for internal combustion engines including a first air blower providing air to a combustion area, a second blower having an ozone generator associated therewith and providing ozone to the exhaust system of the engine, and a filter in the exhaust system including A-shaped perforated baffles alternated with filter elements.

---

Figure 1:
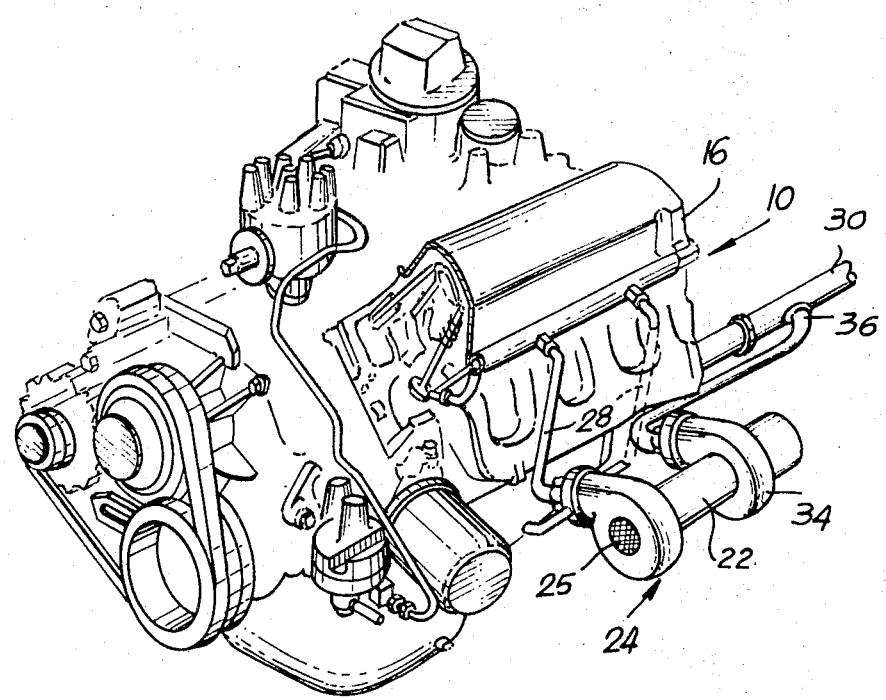

The present invention relates to an air pollution control mechanism which removes harmful pollutants from the exhausts of vehicles. An oxygen generator is connected to the engine where the oxygen generated is fed thereinto to promote the more complete combustion of fuel. Further the oxygen or a form thereof is directed into haust system to react with the pollutants in the exhaust system to oxidize and neutralize the same. A filter is provided to separate large particles of the pollutants from the exhaust fumes of the engine.

For many years, engineers and scientists have been attempting to reduce and control the amount of air polluting fumes emanating from automobile exhausts. Various methods have been attempted, however none so successfully that they have been commercially acceptable.

The United States Government has adopted a number of standards for the qualification of air pollution devices. These standards have been difficult if not impossible to reach by the presently devised system.

The ideal situations are to remove the carbon monoxide and hydrocarbons from the exhausts of automobiles. Commercial and industrial air pollution control, presents other problems since the carbon monoxide problem is not the main source of industrial (smoke stack) pollution.

It is the general object of the present invention to avoid and overcome the foregoing difficulties in and to prior art devices, particularly in automobiles, by the provision of an air pollution control device which is inexpensive and easily maintained.

Another object of the present invention is to provide a reduced amount of pollutants emitted through the exhaust system of an automobile.

A further object of the present invention is to neutralize the pollutants in an automobile engine so that less pollutants are emitted into the atmosphere.

Yet another object of the present invention is to provide a system of filtering from the exhaust of an engine large particles of pollutants.

Still a further object of the present invention is to provide a device in communication with an automobile engine which will permit unpolluted fluid to be emitted through the exhaust of an engine.

Another object of the present invention is to provide a mixing of oxygen and exhaust fumes to reduce the amount of pollutants in the exhaust fumes.

Still another object of the present invention is to provide a device which will eliminate pollutants in the exhausts of automobile fumes.

These objects and other objects, which will become apparent as the description proceeds are achieved by providing an automobile engine having connected thereto an oxygen generator, said oxygen generator being in communication with the exhaust system of said engine, and a filter disposed in said exhaust system for removing particles of pollutants from said exhaust.

In order to more fully understand the nature of the present invention reference should be had to the accompanying drawings wherein like numerals of reference indicate similar parts throughout the respective views and wherein, FIG. 1 is a pictorial representation of the oxygen generator and engine, FIG. 2 is a top view of the present invention, FIG. 3 is a rear view of the filter, FIG. 4 is a cross sectional view of the filter, FIG. 5 is an end view of the filter, and FIG. 6 is a front view of material used in said filter.

Although the principles of the present invention are broadly applicable to all air polluting machines and the like, the present invention is particularly well adapted for use in conjunction with automobile engines and hence it has been shown and will be described.

Referring now to FIG. 2, an air pollution control mechanism is shown attached to an automobile engine and may be generally indicated by the reference numeral 10. As shown in FIG. 2 a standard automobile frame 12 houses and supports an engine 14. The engine 14 has disposed thereon an exhaust manifold 16 and a tube 18 leading from the crankcase 20.

An ozone generator means 22 as described in detail in my earlier patent, U.S. Pat. No. 3,177,650 may be connected to the frame 12, in any convenient manner and disposed in close proximity to the engine 14. Also connected to the ozone generator there may be provided a double blower arrangement 24, one portion of which is in communication with the ozone generator 22 such that the generated ozone may be directed to various parts of the engine or automobile exhaust system 26, as may be hereinafter more fully described. The double blower arrangement 24, may be provided with an intake orifice 25 having a filter disposed therein such that any air, drawn from atmospheres, will be stripped of any impurities such as dust particles. The air which is brought into the blower arrangement 24 and thereafter circulated to the engine 14 is in a clean state so that no impurities will be delivered to the combustion area of the engine 14. The double blower arrangement 24 may be positioned adjacent the engine block such that a belt (not shown) may be tied thereto to activate the double blower arrangement alternatively, the double blower arrangement may be electrically activated by connection to the engine generator or battery (not shown).

In order to more fully complete the combustion of fuel, injected into the engine 14, a plurality of tubes 28 leading from the one portion of the double blower arrangement 24 is connected to the engine 14. The injection of air from atmosphere into the fuel combustion areas of the engine 14 will promote the more complete combustion of the fuel and thereby tending to, and reducing the amount of hydrocarbons and carbon monoxide (air pollutants) created in an internal combustion engine 14. The ozone generator 22 may also inject a portion of oxygen into the combustion areas of the engine to aid in total combustion of the fuel should be utilized. For example, an ozone generator producing an ionized form of oxygen ($O_3$) may be used, and a portion of the ozone fed through the tubes 28 into the fuel combustion area thereby promoting total or complete combustion of the fuel.

One portion of the double blower arrangement assists the feeding of the generated ozone to the fuel combustion area with the engine 14, when so desired.

As further shown in FIG. 2, an exhaust pipe 30 leads from the engine 14 rearwardly, in a conventional manner so that the exhaust fumes of the engine 14 may be vented to atmosphere at the rear end 32 of the frame 12. The crankcase exhaust pipe 18 may also be connected to the exhaust pipe 30 so that the crankcase fumes, which also contains well-known air pollutants, may be vented to atmosphere through the same exhaust pipe 30.

In order to further reduce the air pollutants being vented to the atmosphere through exhaust pipe 30 the second blower 34 of the double blower arrangement may be connected through a Y-connector 36 to the exhaust pipe 30. In this manner the oxygen produced by the oxygen generator 22 may be, in part, fed into the exhaust pipe 30 and therefore will react with the engine exhaust fumes and the crankcase exhaust fumes to decrease the amount of pollution in these combined fumes. The pure oxygens reacting with the fumes may take the form of an oxidizing process which in essence reduces the carbon monoxide and hydrocarbons passing rearwardly through the exhaust pipe 30. As previously stated one form of oxygen, ozone, has been found to react more favorably with the fumes, in reducing the amount of carbon monoxide and hydrocarbons emitted from the exhaust pipe 30.

In order to be sure that the highest percentage of pollutant reduction takes place, a filter arrangement 38 may be disposed in the path of the exhaust pipe 30, after the Y-connection point. With this structural arrangement any particles of unburned fuel may be filtered out of the exhaust fumes before being emitted to the atmosphere. However it may be seen that the Y-connection 36 may be disposed at a position after the filter arrangement 38 so that the ozone generated by the oxygen generator 22 and fed by the second blower 34 of the double blower arrangement 24 will intercept the exhaust pipe 30 after the filtering of the exhaust fumes has taken place. It will be recognized however, that the reactive nature of the ozone is the same whether its mixture with the exhaust fume takes place before or after the filtering arrangement 38, and the affect of reducing air pollutants is exactly the same.

As shown in FIGS. 3–7, the filter arrangement 38 takes the form of an elongated enclosure 40. The enclosure may be in any particular form such as square, rectangle, circular or oval and may be compartmented into various compartments 42. As shown in FIG. 5, a heavy gauge perforated steel A-structure 44 is provided in the first compartment 46 at the intake end. Behind the A-structure a vertical member 48 of heavy gauge perforated steel is provided. This structural arrangement provides for the difference of the stream of exhaust gases entering the intake end 50 of the filter arrangement 38 so that the diffused gases may impinge on a fibrous filter element 52 disposed behind the vertical member 48. Thereafter a second compartment 54 is formed having an A-shaped perforated heavy gauge steel portion 56 therein, similar to the first compartment 46. Here again a vertical member 58 of the same material supports a second filter 60 of fibrous material before a third compartment 62 which is a minor image of the first compartment 46. Thereafter the filtered exhaust gases are emitted from the filter arrangement 38 to the tail pipe 64 and thereafter to the atmosphere.

It may be noted that the first and second filters 52, 60 are adapted to segregate the unburned carbonaceous material from the exhaust fumes and in such capacity is the only form of solids removing material provided. In such capacity they are susceptible to clogging and therefore I have designed the filter arrangement 38 so that the first and second filters 52, 60 are removable and replaceable. To this end the housing 66 of the enclosure 40 may be provided with two doors 68, each door is in respective alignment with the first and second filter 52, 60. In this manner the doors 68 may be opened individually so that the filters 52, 60 may be removed and replaced after 15,000 miles of use. This figure of replacement mileage has been found to be safest to that no damage may be done to the engine 14 because of a blocked exhaust line.

It will be recognized by those skilled in the art that there is little likelihood of the clogging of the first or second filters because the continued movement and shaking of the filter arrangement when the automobile is in use will promote the "shaking off" of the carbon on the filters. This of course permits the more free passage of the exhaust fumes through the filters and reduces the possibility of the clogging of the first and second filters.

It should be noted that the filter arrangement further acts as a replacement for the conventional muffler used on automobiles. Because of its totally enclosed nature, the filter arrangement acts to quiet the normal noises associated with the expulsion of the engine and crankcase exhaust fumes. However, the automobile manufacturer may desire to retain the conventional muffler in conjunction with the filter arrangement, and this combination would be perfectly acceptable.

In operation therefore, it may be seen that ozone produced by the oxygen generator is pumped into the automobile engine to the fuel combination areas by the first blower of the double blower arrangement. At the same time the second blower is directing a portion of the generated ozone through a Y-connection to the exhaust pipe leading from the engine. The oxygen pumped into the engine aids the more total combustion of the fuel and the ozone pumped into the exhaust pipe reacts with the exhaust fumes to neutralize the carbon monoxide and hydrocarbons therein. Thereafter the exhaust fumes are directed through a filter arrangement which removes from the exhaust fumes any large particles of carbon or the like pollutants.

Alternatively the Y-connector may be disposed after the filter arrangement, however with this arrangement, no change in the efficiency of this invention.

It may also be seen that a pressure sensitive valve may be disposed on the exhaust pipe between the engine 14 and filter arrangement to act as a safety device so that if the filters in the filter arrangement were to become prematurely clogged the back-up pressure would release the valve before any damage is done to the engine.

It will be seen that the object of reducing air polluting fumes from the exhaust of engines has been accomplished by using the structural arrangement hereinabove enumerated and that an inexpensive and efficient device for reducing air pollution has been provide.

In accordance with the patent statutes a preferred and alternative embodiment of the present invention has been described in detail; however, it should be particularly understood that the invention is not limited thereto or thereby.

I claim:

1. In an internal combustion engine having a combustion area and an exhaust system, an air pollution control device comprising an ozone generator, a double blower arrangement in communication with said ozone generator, said double blower arrangement being provided with a first blower and a second blower, said first blower being directly connected to the combustion area and adapted to blow air from the atmosphere into said combustion area, said first blower having a filter thereon for removing impurities from the air being transmitted to said combustion area, said second blower being connected to the exhaust system of the engine, a filter arrangement connected to said second blower and said exhaust system and delivering ozone from said ozone generator to said exhaust system at a point before said filter, said filter having a plurality of compartments disposed within an enclosure at least one filter element separating said compartments, said at least one filter element being replaceable and removable from the enclosure, each of said compartments being provided with a heavy gauge material disposed therein, said heavy gauge material being perforated.

2. An air pollution control device according to claim 1 wherein said compartments being provided with heavy gauge material having holes therein, shaped in the form of an A, a plurality of vertical walls of the same material disposed between said compartments.

3. An air pollution control device according to claim 2 wherein said filter element is a fibrous material.

4. An air pollution control device according to claim 3 wherein fumes emanating from the crankcase are directed to said exhaust system.

5. An air pollution control device according to claim 4 wherein said filter acts as a muffler.

References Cited

UNITED STATES PATENTS

| | | | |
|---|---|---|---|
| 2,864,960 | 12/1958 | Von Linde | 60—30 |
| 3,177,650 | 4/1965 | Caruso | 60—30 |
| 3,380,245 | 4/1968 | Mick | 60—30 |

CARLTON R. CROYLE, Primary Examiner

D. HART, Assistant Examiner